United States Patent
Baty et al.

(10) Patent No.: US 6,243,663 B1
(45) Date of Patent: Jun. 5, 2001

(54) METHOD FOR SIMULATING DISCONTINUOUS PHYSICAL SYSTEMS

(75) Inventors: Roy S. Baty; Mark R. Vaughn, both of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/071,134

(22) Filed: Apr. 30, 1998

(51) Int. Cl.$^7$ ................................................. G06F 17/50
(52) U.S. Cl. .................. 703/2; 708/207; 708/400; 703/22
(58) Field of Search .................. 395/500.23, 500.27; 708/207, 400; 703/14, 22, 1, 2

(56) References Cited

U.S. PATENT DOCUMENTS

| | | | |
|---|---|---|---|
| 4,452,590 | * 6/1984 | Trell | 434/281 |
| 5,497,451 | * 3/1996 | Holmes | 395/120 |
| 5,625,575 | * 4/1997 | Goyal et al. | 364/578 |
| 5,813,798 | * 9/1998 | Whiffen | 405/52 |
| 5,831,853 | * 11/1998 | Bobrow et al. | 364/191 |
| 5,966,524 | * 10/1999 | Burnett et al. | 395/500.26 |

OTHER PUBLICATIONS

Zemanian, Armen, "Nonstandard Electrical Networks and the Resurrection of Kirchhoff's Laws," IEEE, 1997, pp. 221–233.*

R. S. Baty, M. R. Vaughn, A Nonstandard Analysis of a Simple Discontinuous Force Equation Modelling Continuous Motion, Journal of Sound and Vibration (1997) 202(2), 288–297.

* cited by examiner

Primary Examiner—Kevin J. Teska
Assistant Examiner—Thai Phan
(74) Attorney, Agent, or Firm—Brian W. Dodson (57) ABSTRACT

The mathematical foundations of conventional numerical simulation of physical systems provide no consistent description of the behavior of such systems when subjected to discontinuous physical influences. As a result, the numerical simulation of such problems requires ad hoc encoding of specific experimental results in order to address the behavior of such discontinuous physical systems. In the present invention, these foundations are replaced by a new combination of generalized function theory and nonstandard analysis. The result is a class of new approaches to the numerical simulation of physical systems which allows the accurate and well-behaved simulation of discontinuous and other difficult physical systems, as well as simpler physical systems. Applications of this new class of numerical simulation techniques to process control, robotics, and apparatus design are outlined.

13 Claims, 3 Drawing Sheets

METHOD FOR SIMULATING DISCONTINUOUS PHYSICAL SYSTEMS

GOVERNMENT RIGHTS

This invention was made with United States Government Support under Dept. of Energy Contract No. DE-AC04-94AL85000. The Government has certain rights in this invention.

BACKGROUND OF THE INVENTION

The present invention relates to a method of numerically simulating physical phenomena, such as mechanical response, heat, viscosity, friction, and electromagnetic effects, occurring in a physical system of interest. More particularly the present invention relates determining physical phenomena in systems which exhibit discontinuous response to physical stimuli, which are subjected to discontinuous physical stimuli, or both.

Numerical simulation using a computer is widely used in industry as a method of simulating the physical response of a physical system to a physical stimulus. By using numerical simulation, it is often possible to reproduce a physical phenomenon, and determine therefrom design principles and parameters. Such practice reduces the number of actual experiments required to reach a final product design, resulting in considerable savings of time and money as well as the possibility of improved functionality of the desired product.

Another application of numerical simulation of physical systems is to provide input to a system controlling a process or action which optimizes that function by determining the current control forces required to obtain a desired future state within constraints established by the nature of the function. An example occurs in robotics, where the desired function can be smooth and rapid motion. A common approach toward determining the control forces for a desired motion involves position and velocity feedback control, but such systems often exhibit jerky motion, or hunting around the desired motion. Control of such systems can be beneficially guided by simulation of the actual dynamics of the robotic system. Similar requirements appear in many mechanical systems, in chemical process control, and in many electronic devices.

The entire process of numerical simulation using a computer can be described as using a computer to transform physical data (material, structure, speed, charge, temperature, etc.) describing a given physical system into physical data describing the behavior of that physical system as a function of time and/or applied conditions. The principle of numerical simulation is to numerically solve equations which are known to provide a sufficiently accurate description of the physical response of a given physical system using a computer. Such equations are usually ordinary or partial differential equations, but integral equations, integrodifferential equations, and many other expressions known to those skilled in the art can appear.

The physical response of a physical system to a physically realizable influence must produce solutions which obey physical continuity and conservation laws. In treating such problems using numerical simulation, time, space, and indeed all system parameters are treated by replacing the true continuous functions with a discretized approximation. In reality all functions in numerical simulation using a computer are discretized owing to the finite word length the computer uses in calculation. Adopting a discrete representation of time and space, thereby restricting physical position to a finite number of 'nodes' and time to an integral number of 'time steps', usually allows the equations describing the physical response of a physical system to be simplified to a set of linear algebraic equations. (Not all numerical simulation is directed toward time-dependent behavior. Such matters as distribution of stress under a given set of external constraints can also be treated, usually as boundary-value or mixed problems.) Many approaches to solution of such systems exist, finite-element and finite difference methods among them.

The aforementioned numerical simulation techniques, however, often fail to provide a physically accurate simulation of the physical response of a discontinuous physical system. Such a system can exhibit a discontinuous physical response to a continuous physical stimulus, or can be subjected to a discontinuous physical stimulus. An example of such effects is provided by motion of a body free, save for friction, along the surface of a plate. The discontinuity in this problem is caused by the fact that stiction, or the static coefficient of friction, is larger than is the dynamic coefficient of friction (commonly simply called friction).

Assume the above system starts at rest. If the plate is subjected to an acceleration small enough that the stiction of the body to the plate is greater than the force applied to the body through its contact with the plate, the body will not move relative to the plate. If the force on the body is just large enough that stiction is overcome, there will be relative motion, but that relative motion will be driven by the difference between the force applied to the body through its contact with the plate minus the dynamic friction associated with moving the body across the plate. As stiction is greater than friction, the body experiences a discontinuous change from no net force relative to the plate to a sizable force relative to the plate.

Such discontinuous driving forces present a problem which prevents most such problems from being properly treated using conventional numerical simulation techniques. Simply put, there is no well-founded method within classical analysis to treat such a discontinuity within a discretized representation of the physical system and consistently arrive at a physically correct solution for the system response. Discontinuous differential equations are usually intrinsically nonlinear, and the application of standard analysis to such equations leads to complicated and detailed limit processes which are difficult to treat, either analytically or numerically. As a result, conventional numerical simulation often leads to physically erroneous results. For example, in the frictional example described above, despite the discontinuity in the relative driving force the dependence of the position of the block relative to the plate is still a continuous function of time—it is not possible for the body to suddenly move from one position to a different position without traversing the distance between. However, this clear physical constraint is commonly violated in this class of systems when conventional numerical simulation techniques are applied.

Many real-world examples of such discontinuous physical systems exist. In addition to friction and various analogs thereto, systems involving impact, shock, phase change, combustion fronts, detonation waves, and many more commonly include some component of discontinuity. Conventional numerical simulation of such problems generally yields ambiguous method-dependent results. This limitation is usually addressed through ad hoc introduction of empirical information from experiment. Such ad hoc adaptations force a certain class of behavior on the physical system being simulated, even when the actual behavior of the physical system enters a qualitatively different regime. As a result, application of conventional numerical simulation techniques to such problems is often misleading.

Owing to the common occurrence and importance of discontinuous physical systems, and the significant difficulties which appear in trying to simulate their physical behavior using conventional numerical simulation techniques, there is a clear need to develop new techniques which address such problems and allow their simulation with a reasonable degree of confidence in the resulting solution. Potential applications include design and evaluation of physical systems under conditions experienced in their intended function, and as part of a control system to control processes having fundamental discontinuities.

SUMMARY

It is an object of the present invention to provide new simulation techniques suitable for accurate and reliable simulation of discontinuous physical systems. It is a further object of the present invention to provide new numerical techniques, implemented in software on a computer, to control physical processes, restricting their operation onto a desired process path or to function within process constraints. It is a further object of the present invention to provide new numerical techniques, implemented in software on a computer, to carry out the design of a physical apparatus so that the behavior of the physical apparatus is in accord with a set of design conditions.

DETAILED DESCRIPTION

Figure 1:
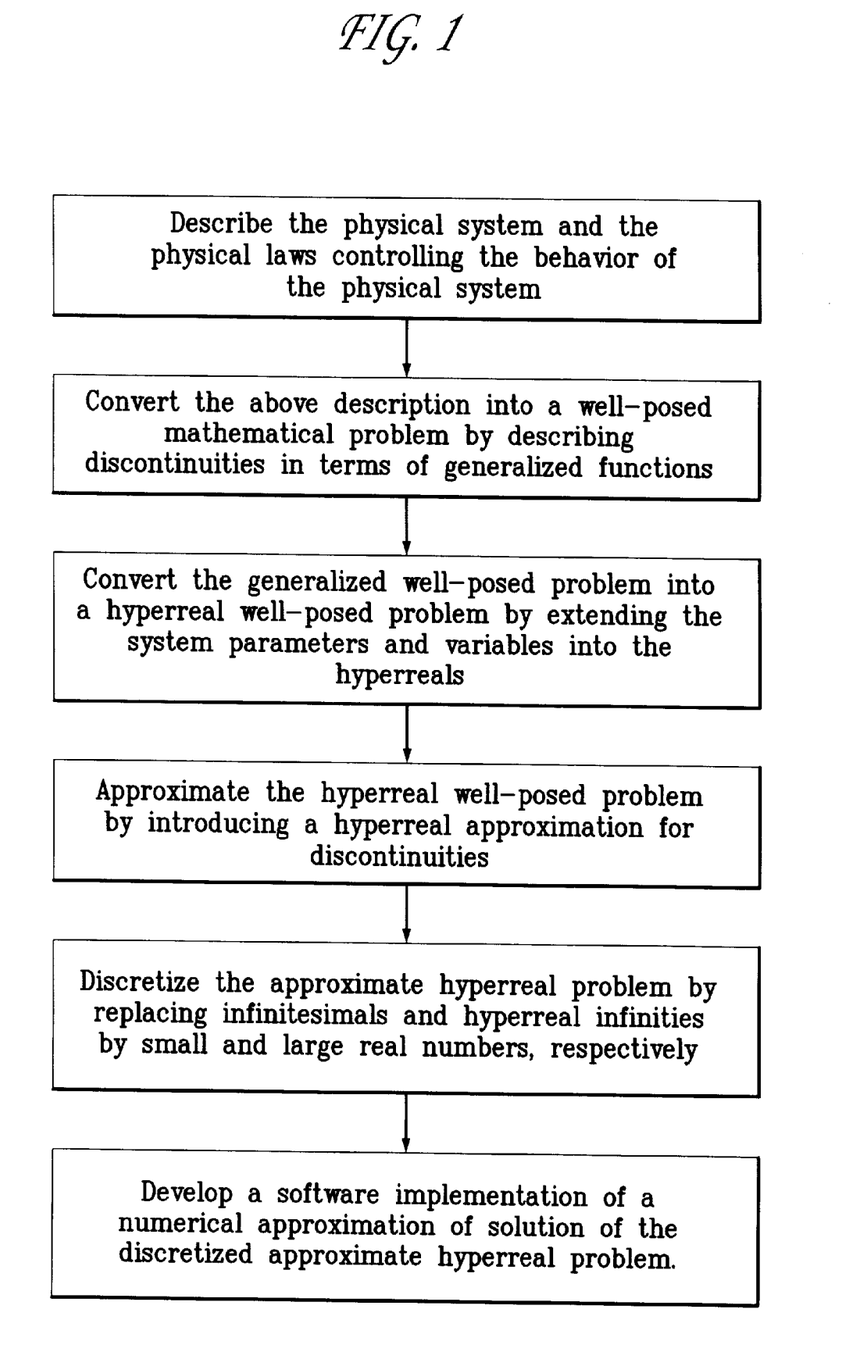
FIG. 1 shows a flow diagram of the procedure by which the present invention models a discontinuous physical system as a software implementation of a valid, well-posed, and well-behaved numerical approximation of the mathematical description of the physical system and physical law.
Figure 2:
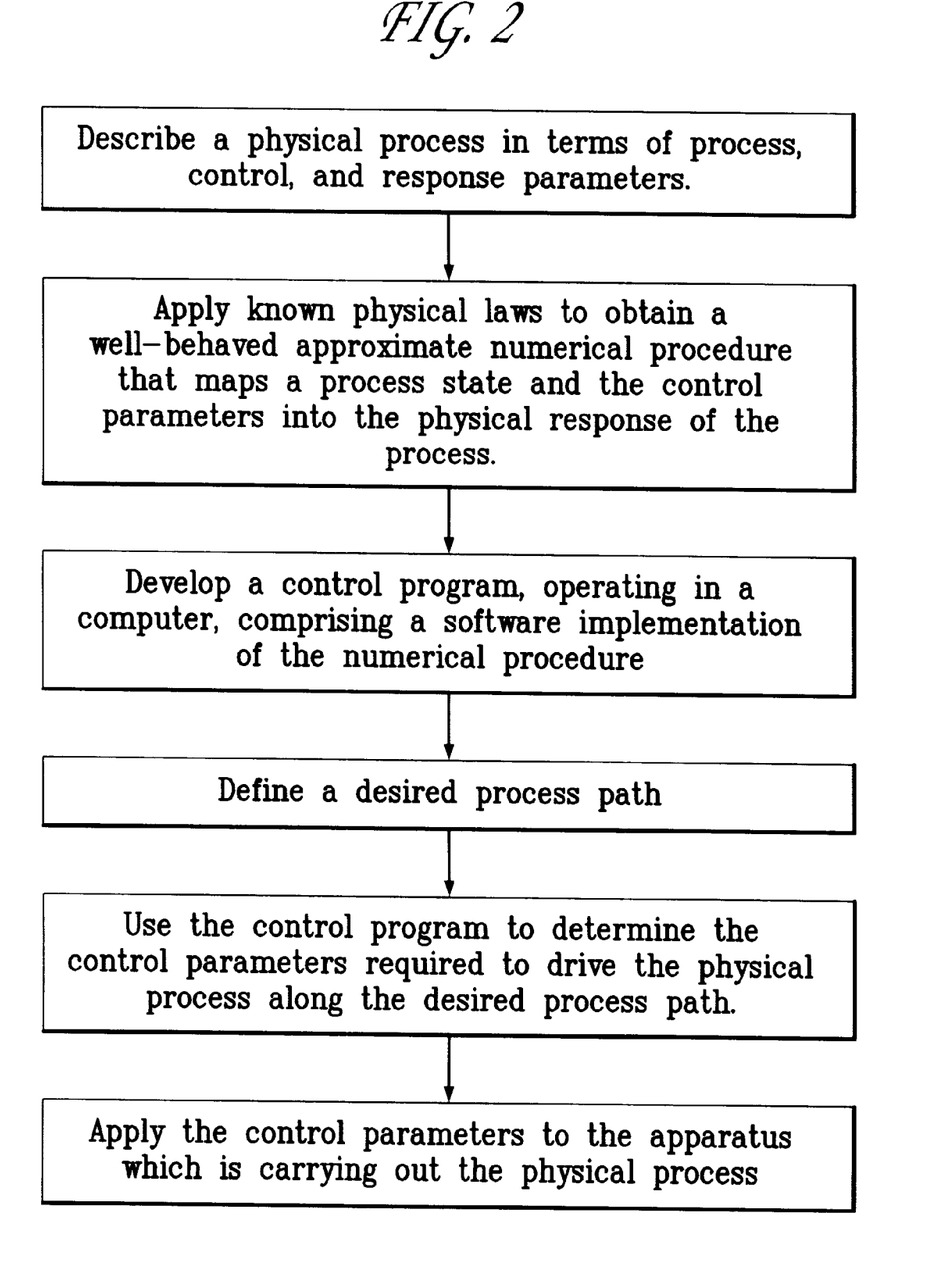
FIG. 2 shows a flow diagram of the procedure wherein the present invention is applied to develop a control program, whose function is to dynamically apply control parameters as input to a physical apparatus on which a process is being carried out, the intent of such dynamical control being to drive the process along a desired process path.
Figure 3:
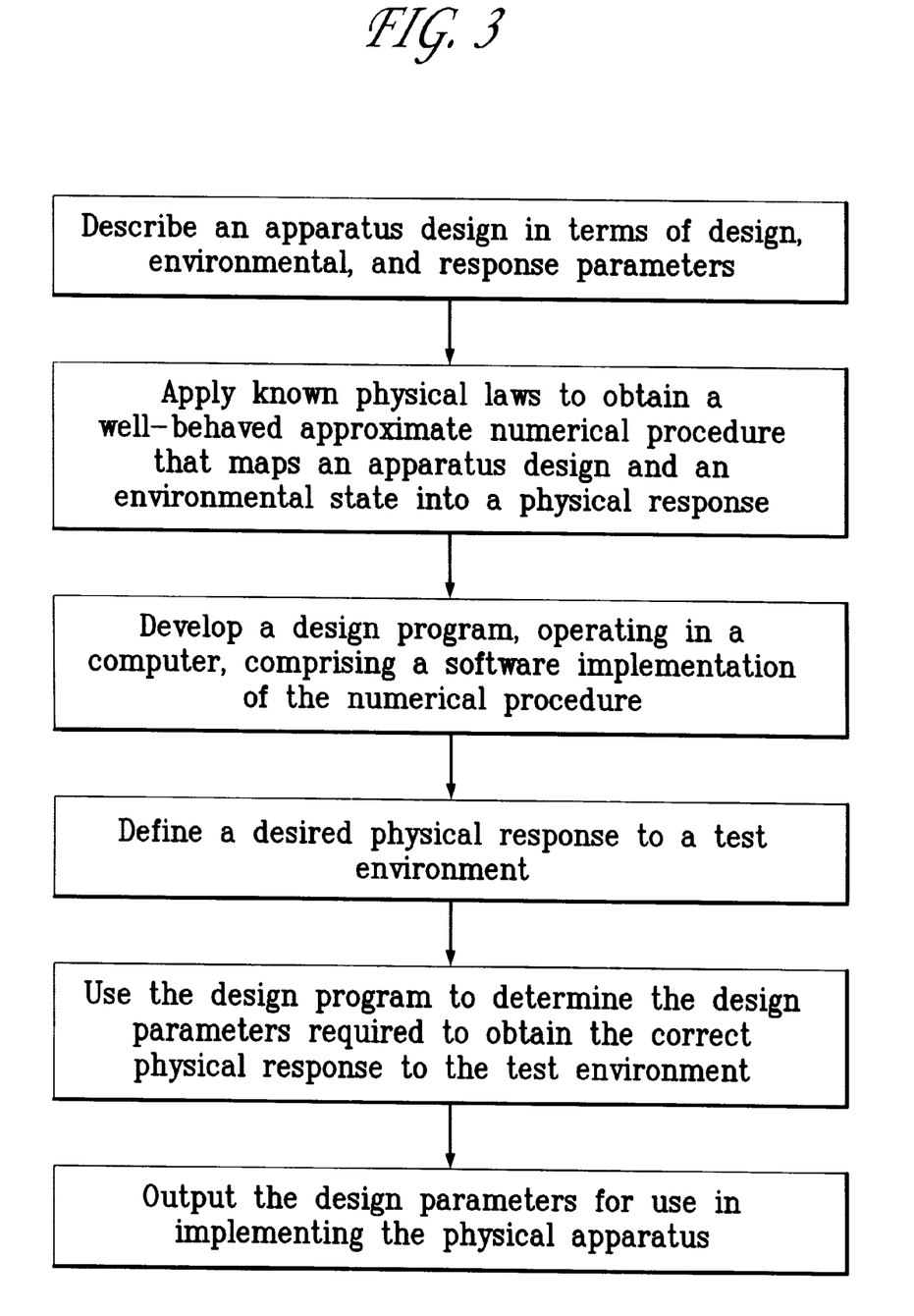
FIG. 3 shows a flow diagram of the procedure wherein the present invention is applied to develop a design program, whose function is to design a physical apparatus so that it will produce a desired physical response to a test environment.

The mathematical foundations of conventional numerical simulation (i.e., classical analysis and function theory) provide no classical solution to discontinuous differential equations, that is, no mathematical description of the response of a physical system exists which is differentiable at all times. (Technically, no $C^1$ solution exists, although piecewise $C^\infty$ solutions often exist.) However, classical solutions can describe the system behavior in regimes which do not contain discontinuous behavior. There are usually a large family of such local solutions possible in each region, and classical analysis does not reveal how to choose solutions in the various regimes which are physically accurate and which have the physically proper relationship across the discontinuities. This information is usually artificially introduced into conventional numerical simulations, without any reason to expect that a particular method of introduction will reproduce the correct physical behavior. In practice, it often does not.

In the present invention, the very foundations of conventional numerical simulation are replaced, resulting in an entirely new approach to numerical simulation. It is important to point out that the mathematical foundation for this invention was also developed by the applicants (R. S. Baty, M. R. Vaughn, and F. Farassat, in Journal of Sound and Vibration, vol. 202, pgs. 288–297, 1997), and is new within the field. This new approach has all the power of conventional numerical simulation, but is also capable of accurately simulating physical systems encountering discontinuities, thereby addressing the needs identified earlier.

Generalized Function Theory

The foundation of the present invention is nonlinear generalized function theory, which was developed by mathematicians in the last two decades to remove the mathematical inconsistencies that occur in problems that combine differentiation with discontinuous functions. Generalized function theory has existed for most of this century. Perhaps the best known example of a fundamentally generalized function is the Dirac delta 'function', $\delta(x-a)$. This quantity can be defined by its integral property $$\lim_{\varepsilon \to 0} \int_{a-\varepsilon}^{a+\varepsilon} \delta(x-a) dx = 1. \tag{1}$$

However, the Dirac delta itself cannot be represented in terms of classical function theory. It is rather a distribution, or a generalized function, which is included in the extension of classical function theory to generalized function theory.

There are an infinite number of ways to approach a classical definition of the Dirac delta, for example, $$\delta(x) = \lim_{\varepsilon \to 0} S(x, \varepsilon) \tag{2}$$

$$\delta(x) = \lim_{\varepsilon \to 0} T(x, \varepsilon) \tag{3}$$

where $S(x,\epsilon)=1/\epsilon$ for $-\epsilon/2<x<\epsilon/2$ and 0 elsewhere, and $T(x,\epsilon)=|x|/\epsilon^2$ for $-\epsilon<x<\epsilon$ and 0 elsewhere. However, no such classical description exists, that is, the limits in (2) and (3) above do not exist in classical function theory. Further, if a classical approximation to the Dirac delta is chosen, e.g., that $\delta(x)=S(x, 0.000001)/0.0000001$, the result of a numerical simulation based on conventional numerical simulation will generally depend both on the form of the approximation and on the value of $\epsilon$ chosen.

Despite the classically discontinuous behavior of the Dirac delta, it is continuous within the context of generalized function theory, that is, the derivative of the Dirac delta is itself a generalized function.

In the analysis of nonlinear discontinuous differential equations, the multiplication of two distributions is often required. By a famous result of L. Schwartz, it is impossible to define a multiplication on the space of distributions so that it is compatible with pointwise multiplication of continuous functions. Such a product is therefore not defined in classical analysis. As a result, nonlinearities involving discontinuities and differentiation cannot be represented as simple linear functionals in terms of the defining variable.

The theory of algebras of generalized functions was initiated independently by J. F. Colombeau and E. E. Rosinger about 15 years ago, in large part to address this class of problems. In this approach, one can construct differential algebras containing spaces of distributions as linear subspaces and the space of smooth functions as a faithful subalgebra while at the same time possessing optimal properties concerning differentiation. Multiplication of distributions can be handled in this framework. Key notions of this approach are regularization processes for gaining smooth representatives of singular objects and factorization of differential algebras in order to obtain satisfying structures.

More particularly, the mathematical inconsistencies associated with multiplying distributions can be alleviated by defining a structure within which a weak, but well-defined, form of multiplication exists. Solutions of nonlinear discontinuous differential equations are defined as equivalence classes of solutions comprising reasonable approximations for the behavior at the discontinuities. By identifying all 'reasonable' approximations for a given problem with an equivalence class of solutions, the mathematical inconsistencies which have led to the misfunction of conventional numerical simulation techniques are resolved.

The above principles can be used to obtain nonlinear generalized solutions to broad classes of discontinuous differential equations, and other discontinuous evolution problems. The determination of a specific nonlinear generalized solution depends on how the nonlinear generalized function is approximated in the neighborhood of the discontinuities. The nature of the approximation for a given physical problem must be chosen to be compatible with the physical constraints of the physical problem, e.g., requiring continuous single-valued motion. In other cases the approximation can be established by fundamental conservation laws.

Sample Problem: Rigid Body Sliding on a Tilted Surface

It is useful at this point to examine how these new mathematical techniques are applied to the simulation of a specific discontinuous physical problem. Consider the motion of a rigid body of mass m sliding on a flat surface subject to both stiction and friction with the surface. Let x, v, and F be the displacement, velocity, and driving force acting on the body, respectively. The motion in one dimension is described using the discontinuous ordinary differential equation $$m\frac{dv}{dt} + f_s \gamma(v) + f_d \sum (v) = F(t) \quad (4)$$

The stictional force, which is only felt when v=0, is modeled using $$\gamma(v)=1 \text{ if } v=0, \text{ and } =0 \text{ otherwise.} \quad (5)$$

The frictional force, which is present only when the body is moving, is modeled using $$\Sigma(v)=\pm 1 \text{ if } \pm v>0, \text{ and } =0 \text{ otherwise.} \quad (6)$$

The stictional and frictional force coefficients, $f_s$ and $f_d$ respectively, are taken to be constant.

A well-posed, but discontinuous, initial value problem results when the initial displacement and velocity are defined:

$$x(0)=x_o, v(0)=v_o. \quad (7)$$

This initial value problem accurately models the continuous motion of a sliding body with friction. However, as pointed out earlier, no classical solution to this problem exists—no classical description of the velocity exists which is differentiable for all time and which satisfies equation 4. However, for times at which the force discontinuities are not experienced (i.e., times of non-zero velocity), classical solutions do exist. However, treatment of the discontinuities is not possible within a strictly classical analysis.

The unique physical solution to equations 4–7 is obtained by patching together the smooth classical solutions which can be obtained between discontinuous force events in a manner which properly describes the physical effects associated with the discontinuities. As mentioned above, however, this physical solution is not generally defined within classical analysis, so is not well-founded mathematically. In many cases, patching together piecewise classical solutions requires precise taking of limits to properly approximate the effects of the discontinuities. As this level of precision is not available in conventional numerical simulation, the prediction of such simulation is often more a function of exactly how the limiting process is described than of the physics controlling the system's physical behavior.

It is possible, however, to obtain well-founded solutions to this class of physical simulation problems. Such solutions are called generalized solutions. In the present example the generalized solutions are single-valued. In general, however, multi-valued solutions are common (e.g., in Euler buckling of a loaded column, there is a regime where the solution can be either the compressed column or the buckled column).

To obtain generalized solutions in the present example, the discontinuous functions are transformed into functionals. Consider a smooth test function φ with compact support in time. Multiplying equation 4 by φ, and integrating by parts with respect to time gives the following functional equation $$-m\int_0^t v\frac{d\varphi}{d\tau}d\tau + \int_0^t \{f_s\gamma(v) + f_d\sum(v) - F\}\varphi d\tau = \quad (8)$$

$$m\{v(0)\varphi(0) - v(t)\varphi(t)\}.$$

As equation 8 contains no term dependent on the time-derivative of the velocity, the possible generalized solutions of 8, and hence for the physical behavior of the body on a surface under a driving force, includes motions which are differentiable, continuous, or discontinuous.

The determination of the physically relevant nonlinear generalized solution from the equivalence class of such solutions depends on the microstructure of the solution near discontinuous influences. Microstructure refers to how the nonlinear generalized function is approximated near such discontinuities. When discontinuities or other influences force modeling a physical system into the realm of nonlinear generalized functions, although equivalence classes of solutions can be identified in a consistent mathematical manner, choosing the physically relevant solution from the members of the equivalence class requires additional physical information.

As mentioned earlier, the additional physical information often takes the form of conservation laws or other physical principles. In the present case, the distinguishing physical requirement is that motion is continuous and single-valued. The generalized solutions must therefore also be continuous functions of time. In this special case, this implies that the microstructure of the generalized solutions resulting in the correct physical description is that no discontinuous solutions are allowed, despite the discontinuous forces acting on the body. As continuous solutions are required, continuous approximations of the discontinuities can be used to obtain approximate generalized solutions to the motion of the body sliding on the surface.

In other circumstances, discontinuity within the physical system will lead to discontinuous generalized solutions. For example, if a shock wave is introduced into a simple continuous elastic medium, many of the system physical variables (e.g., particle velocity, stress, temperature, etc.) will undergo discontinuities at the shock front. The magnitude of these discontinuities are determined by conservation of mass, momentum, and energy across the shock front in the conventional manner. However, the generalized functional analysis described herein a specific physical solution can be found to the physical behavior of the system, whereas using conventional analysis the behavior of the elastic medium near the shock front usually has to be introduced in an ad hoc manner.

To continue the analysis of our sample problem, it is necessary to specify a particular set of applied forces to which the body responds. Equations 4–7 will be adapted to treat a rigid body sliding down an inclined plane. Here a rigid body of mass m is sitting on an inclined plane with an angle of inclination of $\Theta$. The angle of the incline is then increased until the gravitational force exceeds the stictional force and the body begins to slide. Once the body starts to move the angle of the inclined plane remains constant.

For an inclined plane the forces on the body tangential and normal to the incline are given by $$F = mg \sin \Theta \text{ and } N = mg \cos \Theta \tag{9}$$

where g is the gravitational acceleration. The stictional force is modeled by $$f_s = F \text{ if } F \leq \mu_s N, \text{ and } = \mu_s N \text{ if } F > \mu_s N \tag{10}$$

and the frictional force is modeled by $$f_d = \mu_d N \tag{11}$$

where F and N are defined in equation 9, and $\mu_s$ and $\mu_d$ are the static and dynamic coefficients of friction respectively. Since the body is initially at rest, the initial conditions are $x(0)=0$ and $v(0)=0$.

To complete the description of the external influences on the physical system under consideration, so that approximations suitable for numerical simulation can be obtained, the value of the angle $\Theta(t)$ of the inclined plane must be specified as a function of time. For this example, the form $$\Theta(t) = \Theta_m t \text{ if } v=0, \text{ and } = \Theta_m \text{ if } v>0 \tag{12}$$

where $\Theta_m$ is the angle when the static frictional force and the gravitational force are equal. A simple static analysis shows that $\Theta_m = \arctan(\mu_s)$. Clearly $v=0$ for $t<1$, and is positive thereafter.

Finally, the net force on the body must be determined to substitute in as the driving force in equation 4. The net force on the body in the x direction is 0 for $t<1$, and $mg(\sin \Theta_m - \mu_d \cos \Theta_m) = m\beta$ for $t \geq 1$. Substituting this relation into equation 4 gives $$m\frac{dv}{dt} = 0 \text{ if } t < 1, \text{ and } = m\beta \text{ if } t \geq 1. \tag{13}$$

Integrating equation 13 gives $$v = v_1 \text{ for } t<1, \text{ and } = \beta t + v_2 \text{ for } t \geq 1. \tag{14}$$

The condition that $v=0$ for all $t<1$, combined with the physical requirement that the velocity be continuous, allows the constants of integration in equation 14 to be determined. They are $v_1 = 0$ and $v_2 = -\beta$.

Integrating again with respect to time gives the position of the body along the inclined plane as a function of time as $$x = x_1 \text{ if } t<1, \text{ and } = (\beta t^2/2) - \beta t + x_2 \text{ if } t \geq 1 \tag{15}$$

Again, the initial condition combined with the requirement that the position be a continuous function of velocity allows the constants of integration to be fixed as $x_1 = 0$ and $x_2 = \beta/2$.

Equations 14 and 15 represent a complete solution to the discontinuous initial value differential equation derived to model the behavior of a rigid body sliding on an inclined plane. This problem is intrinsically discontinuous in formulation, and the nonlinear generalized solution 14 and 15 are a solution in a multiparameter equivalence class of solutions. Selection of the physically correct solution was made possible by identifying the physically correct initial condition and requiring that the solution be continuous for all times. Applying these physically based conditions automatically selects the physical solution from the equivalence class resulting from the formal analysis.

Nonstandard Analysis and Limit Processes

The example above is simple enough that an generalized analytical solution could be obtained. More generally, however, such a solution will not be found, and numerical simulation to produce the answer will be required. This will involve obtaining approximations to the generalized solutions which can be calculated using numerical analysis.

In cases such as the present example, where the physical constraint is that motion is continuous and single-valued, the above approximation can be carried out using conventional approximation methods. However, such methods are often mathematically difficult to construct, requiring evaluation of complicated integrals and careful limit arguments. Obtaining approximate solutions is simplified considerably, in the present invention, by application of nonstandard analysis to the problem.

Nonstandard analysis is a relatively new area of mathematics, developed in the early 1960's by A. Robinson. In deriving and understanding conventional calculus a la Newton and Leibnitz, the notion of an infinitesimal is used freely. However, such a quantity, which is "essentially but not quite" zero is an ad hoc entity which facilitates the arguments leading to the calculus, but which is not defined in the realm on which the calculus operates. This lack of foundation, although of serious concern early on in the development of the calculus, eventually was accepted because the resulting mathematical structure worked so well. Despite this acceptance, differential and integral calculus was built on mathematically unsound foundations.

Nonstandard analysis was invented to address the problems encountered in the foundations of classical analysis, but has proven to have many other applications. The essential idea of nonstandard analysis is to extend the real number system to a new hyperreal number system. The hyperreal number system includes all real numbers, but also contains infinitesimals, which are smaller than any finite number but not equal to zero. A finite number divided by an infinitesimal is an hyperreal infinite, which is larger than any finite number but not the same as the conventional notion of infinity associated with the real numbers, which is defined as $\infty = \lim_{a \to 0} 1/a$. $\infty$ is an unbounded quantity larger than any real number, but is not itself an element of the real number line. It can formally be included into a closure of the real number line, which is generated by requiring that all limit points of sequences of real numbers be included, but $\infty$ still does not behave as a real number under arithmetic manipulations.

Formally, a hyperreal number x is finite iff there exists an integer n such that $|x| < n$. X is an infinitesimal iff $|x| < 1/n$ for all integers n. The inverse of an infinitesimal is a hyperreal infinite. Although 0 is an infinitesimal, and the conventional notion of $\infty$ is a hyperreal infinite, infinitesimals and hyperreal infinites generally have different properties than do 0 and ∞. This is easily seen in their behavior under addition and multiplication.

In order to maintain a close analogy to the properties of the real number system, a field structure is imposed on the hyperreal numbers. That is, addition and multiplication are defined so that they are commutative, associative, distributive, possess identities, and so that the hyperreal number system is closed under inversion. The additive identity is the real number 0, and the multiplicative inverse of a hyperreal x is defined by x*(1/x)=1.

In the hyperreal number system, 0 is distinct from an infinitesimal s. Since 0 is the only additive identity, s+s=2s, where 2s is a hyperreal quantity differing from s. In contrast, 0+0=0, because 0 is not only an infinitesimal, but is also the additive identity. Similarly, the hyperreal infinity a=1/s obeys the relationship a+a=2a, where 2a is a different hyperreal number than a. (The inverse of 2a is s/2, which by the rules above is a different infinitesimal than s.)

The point of introducing nonstandard analysis in the form of hyperreal numbers into the mathematical basis for the present invention is that analytical limit processes, which must be carefully crafted and can be quite complex (and are essentially incompatible with numerical simulation when discontinuous physical systems are of concern), are thereby converted rigorously into simple algebraic equations. Calculus, which is difficult to use in numerical simulation, is converted into algebra, which offers fewer opportunities for uncontrolled approximations. In particular, discontinuous functions mapping onto the real number system will be replaced with continuous functions mapping onto the hyperreals.

The application of nonstandard analysis to the simulation of the physical behavior of discontinuous physical systems can be illustrated in the context of the example discussed above, the body sliding on an inclined plane. The physical discontinuities are introduced in the stictional and frictional terms of equations 5 and 6, respectively. Let s be a hyperreal infinite. The stictional term, $\gamma(v)=1$ for v=0, and 0 otherwise, is discontinuous in the infinitesimal interval [−1/s, 1/s] about the zero velocity. $\gamma(v)$ is now replaced by the continuous hyperreal approximation $$\gamma(v) = \begin{cases} 0 & \text{if } v > 1/s \\ 1 - sv & \text{if } 0 < v \le 1/s \\ 1 & \text{if } v = 0 \\ 1 + sv & \text{if } -1/s \le v < 0 \\ 0 & \text{if } v < -1/s. \end{cases} \quad (16)$$

Note that although equation 16 is a formally a hyperreal approximation to the discontinuous stiction function $\gamma(v)$, it is infinitely close to the actual function, owing to the nature of infinitesimals.

Similarly, the discontinuous real frictional term $\Sigma(v)=\pm 1$ for ±v>0, and =0 for v=0, can be replaced by a continuous hyperreal approximation $$\sum(v) = \begin{cases} 1 & \text{if } v > 1/s \\ sv & \text{if } -1/s \le v \le 1/s \\ -1 & \text{if } v < -1/s. \end{cases} \quad (17)$$

The above nonstandard expressions are now used to describe the motion of a body sliding on an inclined plane. On substituting equations 16 and 17 into the basic equation of motion for the system, equation 4, and combining with the physical description of the problem from equations 9–11, one finds the following set of five hyperreal ordinary differential equations:

$$\begin{aligned} &\frac{dv}{dt} - g(\sin\Theta - \mu_d \cos\Theta) = 0 \text{ if } v > 1/s \\ &\frac{dv}{dt} + g(\mu_d \cos\Theta - \mu_s \cos\Theta + \varepsilon/g)sv = \varepsilon \text{ if } 0 < v \le 1/s \\ &\frac{dv}{dt} = 0 \text{ if } v = 0 \\ &\frac{dv}{dt} + g \cos\Theta(\mu_d + \mu_s)sv = 0 \text{ if } -1/s \le v < 0 \\ &\frac{dv}{dt} + g(\sin\Theta + \mu_d \sin\Theta) = 0 \text{ if } v < -1/s \end{aligned} \quad (18)$$

Note that an infinitesimal acceleration $\epsilon$ has been added to the second equation as a perturbation to start the body into motion. Such perturbations are often required in simulation of physical systems.

The system of equations at 18, combined with the initial condition x(0)=0 and v(0)=0, automatically generate the physical generalized solution to the sliding body problem, without requiring artificial introduction of the implications of the physical discontinuities. On integration, the solution for the velocity of the sliding body is $$v = \begin{cases} 0 & \text{if } t < 1 \\ c_1 \exp\{\Gamma st\} - \varepsilon/\Gamma s & \text{if } 1 < t \le t_{1/s} \\ \beta t + c_2 & \text{if } t > t_{1/s}, \end{cases} \quad (19)$$

where $\Gamma = g(\mu_s \cos\Theta_m - \mu_d \cos\Theta_m - \epsilon/g)$, $\beta = g(\sin\Theta_m - \mu_d \cos\Theta_m$, $c_1 = (\epsilon/\Gamma s)\exp(-\Gamma s)$, $c_2 = (1/s) - \beta t_{1/s}$, and $t_{1/s} = 1 + \ln\{1 + \Gamma/\epsilon\}/\Gamma s$.

The solution for the position is given by integrating equation 19 with respect to time:

$$x = \begin{cases} 0 & \text{if } t < 1 \\ [c_1/\Gamma s]\exp\{\Gamma st\} - \varepsilon t/\Gamma s + c_3 & \text{if } 1 < t \le t_{1/s} \\ (\beta t^2/2) + c_2 t + c_4 & \text{if } t > t_{1/s}, \end{cases} \quad (20)$$

where $c_3 = -[c_1/\Gamma s] \exp[\Gamma s] + \varepsilon/\Gamma s$, and $c_4 = -(\beta t_{1/s}^2/2) - c_2 t_{1/s}$.

Numerical Modeling of Physical Systems

As before, the sample problem is simple enough that the analytic solution of equations 19 and 20 could be derived explicitly. This, however, is seldom the case when considering realistic physical systems. In particular, computer modeling is usually directed toward the simulation of physical systems exhibiting phenomena far too complex for analytic analysis. Accordingly, the application of the above methods to the construction of numerical approximations which accurately represent the physical behavior of the physical system, but which can be imbedded in a computer program, is needed to complete the present invention.

By combining the initial value problem of equations 4–7 with the nonstandard approximation to the frictional discontinuities in equations 16 and 17, the definition of the frictional forces in equations 9–11, and the time dependence of the incline angle in equation 12, the following set of nonstandard ordinary differential equations describes the physical behavior of the body sliding on an inclined plane:

For v=0, $$dv/dt=0$$

For $0<v\leq 1/s$, $$dv/dt=\epsilon+gsv[(\mu_d-\mu_s)\cos\epsilon_m\epsilon/g]$$

For $v>1/s$, $$dv/dt=g(\mu_d-\mu_s)\cos\Theta_m. \quad (21)$$

Note that the only effect of the infinitesimal force perturbation $\epsilon$ is to nudge the body into motion at the moment when the angle of the incline becomes critical ($\Theta=\Theta_m$). As soon as the velocity is an infinitesimal value, rather than zero, the product sv becomes a finite number. As the $(\mu_d-\mu_s)\cos\Theta_m$ term is always finite, it dominates the other infinitesimal terms for any infinitesimal velocity.

The behavior of the physical system can now be determined by numerically integrating equations 21 from the initial condition of the physical system, e.g., by transforming the ordinary differential equations above into difference equations. In doing so, however, equations 21 are being mapped from the hyperreals to the finite numbers and arithmetic manipulated by computers. The primary requirement here is that the infinitesimal acceleration $\epsilon$ and the hyperreal infinite s must be approximated using numbers found within the implementation of finite arithmetic embedded in the physical structure of the computer and in the operating software thereof. Exactly how this is done is not crucial to the simulation, because the tricky parts involving discretization of limit processes have already been done via use of nonstandard analysis.

One simply takes $\epsilon$ to be a small number relative to the gravitational acceleration g, and takes s to be a large number compared to the time when the body starts to move, t=1. Using smaller values of $\epsilon$ and larger values of s will lead to better approximations to the actual physical behavior of the physical system, the tradeoff being that better approximations will require that smaller discretization intervals must be used to insure the accuracy of the numerical integration. However, the common danger in conventional numerical simulation techniques, that one is actually approximating a nonphysical solution, is no longer encountered.

A simple set of difference equations whose solution is an accurate approximation to the behavior of the physical system described by equations 21 are:

$$\Delta v=0\Delta t$$

$$v=0;$$

$$\Delta v=\{\epsilon+gsv[(\mu_d-\mu_s)\cos\Theta_m-\epsilon/g]\}\Delta t$$

$$0<v<1/s;$$

$$\Delta v=\{g(\mu_d-\mu_s)\cos\Theta_m\}\Delta t$$

$$v>1/s. \quad (22)$$

where $\Delta t$ is the discretized time step and $\Delta v$ is the change in velocity experienced during a single time step. Evolution of the physical system is then numerically simulated by numerically integrating equations 22, using any of a wide variety of well-known techniques.

General Implementation of the Present Invention

Having thoroughly examined the mathematical and structural principles underlying the present invention, and having illustrated their use through detailed analysis of a specific discontinuous physical system, it is now possible to describe the present invention in more general terms.

In order to execute numerical simulation using a computer, it is necessary to provide a program which instructs the computer as to how to carry out the detailed algorithms of simulation. Operation of the computer under the control of such a program will then lead to an approximate description of the physical behavior of a physical system.

The process of numerical simulation of a physical system can be broken down into a number of distinct steps. These include, but are not limited to, the following:

1. Describe the configuration of matter and/or energy corresponding to the physical system;
2. Identify appropriate initial conditions, boundary conditions, conservation criteria, and the like, within which the physical system is to evolve;
3. Describe the behavior of the matter and/or energy within the physical system in terms of physically realistic models;
4. Derive a set of equations which define a mathematically valid and well-behaved solution for the physical behavior of the physical system;
5. Develop a valid and well-behaved numerical approximation to the above set of equations which yield a simulation that approximates the actual physical behavior of the physical system;
6. Write a simulation program which includes the numerical approximation, the configuration of matter and/or energy, the initial conditions, boundary conditions, and/or conservation criteria as needed;
7. Load the program into the computer;
8. Perform the simulation, thereby obtaining an accurate approximation to the actual physical behavior of the physical system.

The entire process of numerical simulation using a computer can be described as using a computer to transform physical data (material, structure, speed, charge, temperature, etc.) describing a given physical system into physical data describing the behavior of that physical system as a function of time and/or applied conditions. A similar list of steps would describe the use of numerical simulation of physical systems in control systems, such as the robotic problem discussed earlier.

The present invention is intended to include the entire process of numerical simulation, as well as specific areas described above. In examining the list above, many elements are common to any system which performs numerical simulation of a physical system. Certainly the description of the physical system and the conditions within which its evolution or response is to be determined (steps 1–3) is required in any numerical simulation of a physical process. Similarly, the conversion in steps 6–8 of the numerical approximation into a computer program, and the process of loading the program into a computer and running it are also widely required. It is rather in steps 4 and 5 that numerical simulation or physical systems according to the present invention diverges strongly from conventional practice.

As described earlier, discontinuous physical systems cannot be properly described within the usual constraints of classical analysis. As a result, in such classes of physical systems (and many others in which the mathematical difficulty is related, but is not due to simple discontinuities in the physical system), one must seek mathematical validity within generalized function theory, which involves additional mathematical entities not included in classical analysis. Part of the present invention is to base the derivation of a mathematically valid and well-behaved set of equations which accurately describe the physical system in generalized function theory.

We have also seen that use of generalized function theory, although resulting in a well-posed problem having an equivalence class of generalized solutions, still requires the use of complex and delicate limit procedures to select out the specific member of the class of generalized solutions which corresponds to the actual physical behavior of the physical system. Such procedures are difficult to perform analytically, and are often unstable when an attempt is made to deal with the limit behavior numerically. As a result, another part of the present invention is to analytically replace the limit procedures required to correctly describe physical discontinuities in real analysis with algebraic conditions within nonstandard analysis using the hyperreal numbers.

Use of the hyperreal numbers not only satisfies the requirement of step 4 to provide a set of well-founded equations which defines the physical behavior of the physical system. They also provide a simple and well-controlled route to execute step 5, the development of a numerical approximation to the equations developed in step 4. A common problem in conventional numerical simulation, especially in physical systems with discontinuities, is to insure that the numerical approximation to the physical behavior provides a description of the physical variable of the system which are close to the actual behavior. In other words, that the numerical approximation approximates the physically relevant solution.

In conventional numerical simulation of discontinuous physical systems, the need to accurately simulate limit processes while using a discretized description of the physical system is particularly difficult to address. In the present invention, however, accurate approximation to the actual physical behavior of the physical system, as described by the generalized hyperreal solutions, is easily obtained within a discretized description suitable for program development. This is accomplished in the present invention by setting infinitesimals to a convenient very small finite number, and hyperreal infinites to a convenient very large number. The numbers chosen to replace hyperreals determine how good the approximation to the actual physical behavior is, but (barring accidental interaction with the discretization of the physical system) the numerical simulation will always be an approximation to the physically correct solution. This result, which is a requirement in development of robust and accurate numerical modeling systems, is not exhibited by conventional numerical modeling techniques.

Applications

The present invention can be usefully applied to a wide variety of applications involving the physical behavior of physical systems. Among these are the simulation of the behavior of a physical system, the use of such a simulation in the control of a process, and the use of such a simulation in an automated system to obtain an optimal design for a class of physical apparatus. Specific approaches to embedding the present invention in such applications is discussed below. Discussion of a specific approach is not intended to restrict the scope of the present invention to those approaches.

1. Numerical Simulation of a Physical System

The case of an apparatus to numerically simulate the behavior of a physical system in an external environment will be treated first, as this is an intrinsic part of most other applications. The apparatus comprises a computer having memory and output means, and a simulation program resident on and running within the computer. The output means can be passive (e.g., a printer or display) or active (e.g., a numerically controlled machine tool or rapid prototyping device).

Resident in the memory is a description of the physical system. It is convenient, but not necessary, to split the description of the physical system into three parts—the physical structure of the physical system, the external influences to which the physical structure is subjected (here called external environment), and the physical behavior of the physical structure to the external environment.

To illustrate how the above splitting of the description of the physical system is intended, consider the earlier example of a body sliding on an inclined surface. The physical structure can be taken as the mass and position of the body, the frictional and stictional forces acting on the body, and the incline angle of the surface. The external environment is the initial conditions, being in a gravitational field, and the forced dependence of the incline angle as a function of time. The physical response is the acceleration of the body. This split is not unique, and many of the entities are clearly not independent, but the split can be used in the simulation process.

Each of these three parts can be idealized in terms of a set of parameters. In the above example, the mass of the body, the position of the body, the incline angle, the frictional coefficient, and the stictional coefficient form a set of 5 configurational parameters which describe the physical structure. Accordingly, the physical structure can be thought of as an element of a 5-dimensional phase space. Similarly, the external environment can be thought of as an element of a 5-dimensional phase space, the environmental parameters being the initial position of the body, the initial velocity of the body, the magnitude of the gravitational field, the initial incline angle, and the velocity imposed on the incline angle. The physical response of the system can be described as an element of a 1-dimensional phase space, the response parameter being the acceleration of the body. In general, there is no requirement that the dimensionality of the phase spaces be the same. When physically appropriate, the parameters can depend on time or other parameters.

The phase spaces introduced above are called the configurational space C, the environmental space E, and the response space B. An n-parameter description can be embedded in $R^n$ in a natural manner which allows the natural vector space structure of $R^n$ to be mapped onto the phase space. Intuitively, two points in a phase space are connected by a vector whose components are given by the difference in the parameter values of the two points.

There are generally physical constraints to the physical system which restrict the range of the parameters. In a strict mathematical description of such a physical system, it is inappropriate to allow the description of a physical system to take on unphysical parameters. Such constraints take on several forms. In the above example, the body is constrained to remain on the surface. This constraint is embedded into the description of the example by transforming the problem into a coordinate system which includes motion along the inclined plane as one of the basis vectors, and then only including that coordinate in the description of the problem. It is also necessary to limit the angle of the inclined plane to be between ±90 degrees, or the body will fall off the surface of the inclined plane in response to gravity—a very different problem than the one we set out to model.

One could use a two-dimensional description of the position of the body, but either there would be a fixed relation between the two coordinates, thereby reducing the effective dimensionality of the description back to one, or the body would be allowed to take on nonphysical locations, i.e., away from the inclined surface.

The next component of the apparatus is a software implementation of a valid and well-behaved numerical procedure which maps (or transforms) an element c∈C and an element e∈E into an element b∈B. The intuitive purpose here is to define the structure of a physical system (the lever arm is 6 inches long and fixed, the weight of the body is 3 pounds and fixed, etc.) as the point c∈C, to describe the external influences on the structure of the physical system (external applied forces, gravitational constant, power to a heater, etc.) as the point e∈E, and given those two points, simulate the physical response of the system (rate of change of position, angle, force, temperature, etc.) as a point b∈B.

The valid and well-behaved numerical procedure to map a set of configurational parameters and a set of environmental parameters to a set of response parameters is based on that developed earlier in the specification. To summarize, a valid and well-behaved discretizable mapping of a set of configurational parameters and a set of environmental parameters into a set of response parameters is obtained by steps comprising:

1. Describing the physical system and the physical laws controlling the properties of the physical system as a well-posed problem relating the configurational and environmental parameters to the response parameters;
2. Converting the well-posed problem into a hyperreal well-posed problem; and,
3. Mapping the hyperreal well-posed problem into a discretizable classical problem by replacing infinitesimal and hyperreal infinite parameters with small and large real numbers, respectively.

The details of the above procedure were discussed extensively earlier in the specification.

The discretizable classical problem must now be mapped onto a numerical approximation expressed in the finite arithmetic compatible with software implementation and operation on a physical computer. Assume for simplicity that the structure of the physical system, the forces influencing the physical structure, and the response of the physical structure to the forces are cleanly divided into the three parameter spaces C, E, and B, respectively. If the physical system is a mass moving in space subjected to external forces, the position of the mass and the value of the mass are parameters in C, the applied forces are parameters in E, and the accelerations of the mass resulting from the applied forces are parameters in B. (Essentially dividing the system description into "Acceleration"="Forces"/"Mass", or Response=Environment/Configuration.)

The discretizable classical problem determines the map $$M:C \times E \rightarrow B$$

and the paths $\Gamma_c(t)$, $\Gamma_e(t)$, and $\Gamma_b(t)$, where t is an evolutionary parameter ("time"). In general, although we know how to perform the mapping M at any given point, the precise structure of the phase spaces C, E, and B are not known (e.g., since the three sets of parameters need not be independent, it is often not possible to analytically determine what limits on the structures C, E, and B result from the physical constraints on the physical system being simulated).

In the numerical approximation of such problems, time can be described as increasing in discrete time elements of duration $\delta t$. At time $t_n = n\delta t$, the configuration of the physical system is described by the point $c_n \in C$, the environmental influences on the physical system are described by the point en $e_n \in E$, and the response of the physical system to the environmental influences are described by the point $b_n \in B$.

One approach to obtaining a numerical approximation of the discretizable classical problem is to determine the configuration point $c_{n+1}$ by numerically integrating from the prior configuration point $c_n$ based on the timestep $\delta t$, the prior response point $b_n$, and the prior environmental point $e_n$. Recalling the qualitative natures of these points, c being "positions, velocities, and masses", e being "applied force", and b being "accelerations", the numerical integration is carried out in accord with the physical laws relating response to configuration. In the "natures" described above, the appropriate physical law is a=F/m, acceleration is force over mass. To obtain new positions from known accelerations, one integrates twice with respect to time:

$$x_{n+1} = x_n + v_n \delta t + (a_n/2)\delta t^2.$$

Although more accurate integration schemes are known, this will suffice for the present discussion. The above integration can be formalized into the form $$c_{n+1} = c_n + F(\{b_{m \leq n}\}, \delta t),$$

where F is a function which describes the effects of the physical response of the physical system on the configuration of the physical system. In the simulation of a general physical system, analogous procedures, again based on the physical laws controlling the response of the physical system, must be followed to determine $F(b_n, \delta t)$ Once this is accomplished, the desired numerical approximation is complete.

However, within that numerical approximation the point $c_{n+1}$ may not lie on any curve $\Gamma_c$ which is consistent with the previous c, e, and r points. Indeed, in many cases the point $c_{n+1}$ may not be an element of C. The procedure outlined above is thus ill-founded, leading to solutions not in the formal description of the problem.

Fortunately, this problem is resolved on mapping into the finite arithmetic required if the procedure is to be implemented in software on a real computer. In finite arithmetic, not only the numerical solution to the behavior of a physical system is approximate, but so is the description of the physical system. As a result, the approximate solution in terms of an approximate description of the physical system resides in $R^n$ near, but not generally in, the phase spaces C, E, and B. On enlarging the numerical approximation to the discretizable classical problem to this larger arena, the numerical approximation becomes well-defined. Developing such a numerical procedure, and fabricating a software implementation thereof, can be accomplished by one skilled in the art based on the theoretical background and examples presented earlier.

Considerable gains in efficiency in obtaining numerically simulated behavior of a physical system in an external environment can be obtained by limiting the description of the physical system and the external environment. For example, any physical structure has a temperature distribution and a mass distribution. If the problem of interest is to determine heat flow in the physical structure, the issues of how much the structure weighs and if there is a gravitational field are usually irrelevant. Accordingly, the description of the physical system can often be simplified by restricting attention only to those parameters with significance to the questions about physical response one desires to answer by carrying out the numerical simulation.

2. Control of a Physical Process

As mentioned earlier, the present invention can be used in broader venues than simple numerical simulation. Consider a system whose purpose is to direct the operation of a process. The process can be the motion of a mechanical apparatus, such as a robotic mechanism, or a chemical synthesis process, or essentially any other process based on the function of a physical apparatus.

There is considerable overlap between systems to direct such control problems and the simple numerical simulation apparatus described earlier. In both cases the physical behavior is described using set of parameters. Here the sets are the process parameters, which define the physical laws and the physical structure of the apparatus on which the process resides, the adjustable control parameters, which describe inputs into the apparatus which can be set to control the process, and the response parameters which describe the change in the process parameters in response to the apparatus inputs.

The distinction is that in this case there is some description of a desired process path, this being the course that the operator would prefer the process to follow. As a result, the problem is not to determine the evolutionary response of a physical system to applied external influences, as in simple numerical simulation, but rather to determine a set of applied external influences which will cause a process taking place on a physical apparatus to follow a desired course, or to obey a given set of constraints.

Many types of process path can be defined. In the context of robotic motion, for example, the desired process path can define the position of the machinery at every point in time during the implementation of the process. Alternately, it may require only that a desired endpoint be reached by a given time. As an example, the position of the machinery at t=37 must be described by a specific point p which is an element of the process phase space, but the details of how the machinery gets there is not important.

Another type of desired process path is a requirement for smooth movement between two points. A common problem with robotic mechanisms is that, in fighting stictional forces to start a motion, they provide too much force once motion has started. As a result, a certain amount of jerky motion combined with overshoot of target positions is common. Requiring that the process path be smooth in the time parameter as well as arriving at the right place will direct the process toward smooth movement.

A related problem is the tendency of robotic mechanisms to exhibit instabilities about a desired end point when that end point is being approached. Again, if the desired process path is required to smoothly converge to the desired end point (e.g., to always move closer to the desired end point), such hunting behavior could be eliminated by a control system of the type made possible by the present invention.

Depending on the nature of the desired process path and the physical laws describing the process, the task of obtaining values for the adjustable control parameters can be local or global in nature. A process is controlled locally if at each moment in time numerical simulation is used to determine what change in the adjustable control parameters are required to keep the process on (or near) the desired process path.

A process is globally controlled if numerical simulation is used to determine, based on the present (and possibly past) states of the process, future values for the adjustable control parameters which will produce a process path compatible with the desired process path. In the strongest form, global control requires that the entire future evolution of the process be simulated, and that the adjustable control parameters be varied until an acceptable process path is found. As such, global control takes on many of the features of a variational optimization, whereas in local control the adjustable control parameters are continually adjusted in response to current error with respect to the desired process path.

There are many approaches to local control of a process. One possible implementation will be illustrated here so that the application of the present invention can be placed in context. This is not intended to limit the application of the present invention to any particular implementation of local control of processes.

The process and the apparatus on which the process takes place is described in terms of a point $p \in P$, where P is the set of process parameters, a point $c \in C$, where C is the set of adjustable control parameters, and $b \in B$, where B is the set of response parameters. The valid and well-behaved mathematical description of the process and its response to adjustable control parameters, which is developed using the generalized functional and hyperreal descriptions described earlier, can be used to define a mapping $M: P \times C \rightarrow B$. an actual evolution of the process in time is described by the paths $\Gamma_p(t) \subset P$, $\Gamma_c(t) \subset C$, and $\Gamma_b(t) \subset B$. Using a discretized timestep $\delta t$, so that $x_n = x(n\delta t)$, the paths $\Gamma$ can be approximated by the sequences $\{p_n\} \in P$, $\{c_n\} \in C$, and $\{b_n\} \Gamma B$.

At timestep n, the process points $p_{n-1}$, $c_{n-1}$, and $b_{n-1}$ are known. The process point $p_n$ can be determined approximately by integrating the effect of the response parameters at $b_{n-1}$ on $p_{n-1}$ over a length of time $\delta t$. (As the response $b_{n-1}$ is considered to be constant for $\delta t$ in this approximate numerical integration, $p_n$ is quite independent of the value of $c_n$. This independence allow the definition of a mapping $M:B \rightarrow P$, so that $M(b_{n-1}) = \Delta P_{n-1}$, where $\Delta P_{n-1} = p_n - p_{n-1}$. However, because of the approximate integral, the resulting $p_n$ may not be an element of P.

To avoid this and many similar technical difficulties, the mathematical description of the process is projected onto the tangent bundles of the phase spaces. This yields a satisfactory approximation to the original problem. Briefly, a tangent bundle over a k-dimensional space S is the collection of the tangent spaces at each point $s \in S$. The tangent space $T_sS$ at $s \in S$ is formed by attaching a copy of $R^k$ tangential to S at s so that any vector $v \subset S$ at $s \in S$ has an associated vector $v' \subset T_sS$.

In terms of the tangent bundle structure, the mapping $M:B \rightarrow P$ can be replaced by a mapping $\mu_n: T_{n-1}B \rightarrow T_nP$. Now $\mu_n(\Delta b') = \Delta p'$, where $\Delta b' = b'_n - b'_{n-1}$, and $\Delta p' = p'_{n+1} - p'_n$. The map $\mu_n$ is invertable, and is well-defined even under the numerical approximations required to obtain a software implementation. Choose a complete basis for a k-dimensional $T_nP$ to be a set of vectors $\{p_i | i < k \ni i \in N\}$. The mapping $\mu_n^{-1}$ can be used to form an equivalent basis in $T_{n-1}B$, where the basis is a set of vectors $\{\beta i\}$ so that $\mu_n^{-1}(\rho i) = \beta_i \in T_{n-1}B$. Although the resulting basis in $T_{n-1}B$ may not be complete, or may be overdetermined, it is suitable for the present purpose.

To enable the present invention, a desired process path $\gamma(t) \subset P$ defines the desired process. At time $n\delta t$, the process point $p_{n+1}$ is determined by the mapping $M:B \rightarrow P$ as the point which will result, at time $(n+1)\delta t$, from the process response $b_n$. The object of the present invention is thus to find a set of control parameters $c_n$ which will produce a process response $b_n$ that will produce a next discretized state of the process $P_{n+1} = \gamma_{n+1}$. In the tangent space approximation, the next evolutionary step of the process is given by the vector $\Delta p = p'_{n+1} - p'_n$. If $\Delta p$ is instead taken as equal to $\gamma'_{n+1} - p'_n$, then $\Delta p$ can be used as the input to the problem of solving for $c_n$.

Expand $\Delta p$ in the basis vectors $\{\rho_i\}$ in $T_nP$ to give $$\Delta p = \Sigma \alpha_j \rho_j, \ j \leq k.$$

The inverse mapping $\mu_{n-1}(\Delta p) = \Delta b$, where $\Delta b = b'_n - b'_{n-1}$, can be expressed in terms of the basis $\{\beta_i\}$ in $T_{n-1}B$ as $$\Delta b = \Sigma \alpha_j \beta_j.$$

$\Delta b$ defines the process response needed to drive the process onto (or near, as this is an approximate numerical procedure) the desired process path.

What remains is to determine what process parameter control inputs at $t_n$ will give a response $b_n$ consistent with $\Delta b$, i.e., that will produce the desired process. At time $n\delta t$ the response $b_n$ will be determined by the process point $p_n$ and the adjustable control parameters $c_n$. (This need not be true for the present invention to function, but simplifies the description considerably.) We can therefore keep $p_n$ constant, and use the mapping M:P×C→B to define a new mapping $\tau$:C→B so that $\tau(\Delta c) = \Delta b$, where $\Delta = c_n - c_{n-1}$.

On projection into the tangent bundle, the mapping $\tau_n:T_{n-1}C \to T_{n-1}B$ is defined. The map $\tau_n$ is again invertable, and its inverse can be used to establish a basis $\{\epsilon_j\}$ on $T_{n-1}C$ from the basis $\{\beta_j\}$ on $T_{n-1}B$ through the relation $$\epsilon_j = \tau_n^{-1}(\beta_j).$$

Again, the basis $\{\epsilon_j\}$ need not be complete, and can be overdetermined, but will provide a suitable relation between $T_{n-1}C$ and $T_{n-1}B$ for the purposes of the present invention.

The vector space structures on the various spaces interrelated through the various mappings described above insure that the mapping of a basis vector in one space to a basis vector in another space have the same "length". As a result, the basis $\{\epsilon_j\}$ in $T_{n-1}C$ allows the desired process evolution $\Delta p$ to be related to a $\Delta c$ that produces $\Delta p$.

$$\Delta p = \Sigma \alpha_j \rho_j;$$

$$\mu_n^{-1}(\Delta p) = \Delta b = \Sigma \alpha_j \beta_j; \text{ and,}$$

$$\tau_n^{-1}(\Delta b) = \Delta c = \Sigma \alpha_j \epsilon_j.$$

$\Delta p$ is a known quantity. Once a basis is chosen on P, the mappings based on the physical description of the process define basis vectors on B and on C. Because the basis vectors in the various spaces have the "same size" relative to the process, the desired result, the $c_n$ that will force the process from $p_n$ to $\gamma_{n+1}$ has the same expansion constants as does $\Delta p$. When the above procedure is continued over the duration of the desired process, the present invention will provide a set of control inputs which will force the process to approximately follow the desired path.

As mentioned earlier, the constraint on the process path need not be a specific process path, but can involve restricting the region within which the process may exist. For example, one can require that the process to function smoothly as it operates, thus avoiding any abrupt changes in the process parameters. An example in robotics would be to require that the acceleration and jerk associated with a motion be limited. This can be called smooth motion of the process.

Another type of constraint is to dynamically restrict the region within which the process can exist. This can require that the process always move closer (in terms of some appropriate metric on P) to the desired endpoint. In robotics, an example would be to require that a moving arm always move toward the intended end point. This can be called smooth convergence of the process.

Numerous other process constraints exist, and can be enabled in a process control system according to the present invention. At times a global process control implementation of the present invention, where the adjustable control parameters are determined (essentially) variationally, will be more appropriate. Such techniques are well-known in the art, and global implementations of the present invention are relatively straightforward. Suitable global optimization techniques include Monte Carlo and simulated annealing.

3. Optimization of an Apparatus Design.

Another class of implementations of the present invention are directed at the optimization of an apparatus design, when the optimization criterion is that the apparatus should respond to a test environment with a desired response. An example of such an apparatus is a shock absorber with a ported piston, described by a piston diameter, a port diameter, and a fluid viscosity. The test environment could be a load of 50 pounds, and the desired response could be a steady-state piston velocity of 1 inch per second. The goal is to vary the design parameters (piston diameter, port diameter, and fluid viscosity) to obtain the desired response parameters (steady-state piston velocity) given the test environmental parameters (load).

As earlier, it is convenient to separate the above factors into three phase spaces, A being the set of apparatus design parameters, E being the set of environmental parameters, and B being the set of apparatus response parameters. The physical laws describing the response of the apparatus constructed according to a particular set of design parameters then relate points in E to points in B. This description of the physical problem, which must be valid and well-posed for the apparatus and environment in question, defines a mapping M:A×E→B. Given this mapping, a system to solve problems involving design selection to a desired response can be developed using the same approach discussed in section 2 above for making a system to direct a process along a desired path.

Several classes of utilities of the present invention, and several specific implementations thereof, have been described herein. In doing so, there is no intention to limit the scope of the present invention. Rather, that scope is intended to be set by the specifications and the claims attached thereto.

What is claimed is:

1. A method for simulating on a computer the physical behavior of a physical system, comprising the steps of:

a) generating a description of the physical system and the physical laws controlling the physical properties of the physical system in terms of a well-posed problem in generalized function theory for the behavior of a set of system variables and a set of system parameters;

b) converting the well-posed problem into a hyperreal well-posed problem by steps comprising extending system variables and system parameters into the hyperreal number system;

c) discretizing the hyperreal well-posed problem by steps comprising replacing infinitesimal and hyperreal infinite system variables and parameters with small and large real numbers, respectively; and, d) approximating the physical behavior of the physical system by steps comprising creating a software implementation of the discretized hyperreal well-posed problem, mounting said software implementation on a suitable electronic computer, and operating said computer so as to perform said approximation.

2. The method of claim 1, wherein the step of generating a description comprises simplifying the set of system variables and the set of system parameters so that a subset of the physical behavior of the physical system is simulated.

3. The method of claim 1, wherein the step of converting the well-posed problem into a hyperreal well-posed problem comprises converting limit processes contained in the well-posed problem to algebraic relations within the hyperreal well-posed problem.

4. The method of claim 1, wherein the physical system is discontinuous.

5. The method of claim 1, wherein the physical system is nonconservative.

6. The method of claim 1, wherein the physical system includes frictional forces.

7. A process control system to control a physical process, comprising:
   a) a process apparatus controlled by input of a set of adjustable control parameters, and comprising diagnostic devices to measure and output values of a set of process parameters;
   b) a process control computer, comprising a central processing unit, a memory, means to accept process parameters input from the process apparatus, and means to output adjustable control parameters to the process apparatus;
   c) a control program, loaded in said memory and operating in said process control computer, comprising:
      1) a set of desired process parameters describing a desired process path;
      2) a routine to input and store in the memory the set of process parameters from the process apparatus;
      3) a software implementation of a discretized well-posed hyperreal problem generated using the method of claim 1, such that said software implementation generates an approximation of the physical response of said physical process when run on the process control computer;
      4) a process correcting routine, comprising:
         a) a predictor which uses said software implementation to approximate a future state of the physical process, said future state being described in terms of a set of predicted process parameters;
         b) a corrector which compares the set of predicted process parameters to the set of desired process parameters, and alters the set of adjustable control parameters such that the physical process is directed more closely along the desired process path; and,
      5) a routine to output the altered adjustable control parameters to the process apparatus.

8. The process control system of claim 7, wherein the discretized well-posed hyperreal problem is generated using the method of claim 4.

9. The process control system of claim 7, wherein the physical process comprises control of a robotic mechanism.

10. An apparatus design optimizer, said apparatus design optimizer comprising:
    a) a computer comprising a central processing unit, memory, and output means;
    b) a design optimization program, loaded in said memory and operating in said computer, comprising:
       i) a set of design parameters describing a proposed apparatus;
       ii) a set of environmental parameters describing external conditions to which the proposed apparatus is subjected;
       iii) a set of design response parameters describing the physical response desired from the proposed apparatus when subjected to said external conditions;
       iv) a software implementation of a discretized well-posed hyperreal problem generated using the method of claim 1, such that said software implementation generates an approximation of the physical response of the proposed apparatus to the external conditions when run on the computer, said approximation being expressed as a set of test response parameters;
       v) a response error routine to calculate the response error between the physical response described by the set of test response parameters and the desired physical response described by the set of design response parameters;
       vi) a design corrector which uses the approximation error to generate a new set of trial design parameters such that the physical response of the new apparatus design is closer to the desired physical response;
       vii) an iterative routine to repeat steps iv, v, and vi, until the approximation error for the current set of trial design parameters falls below a predefined level, whereupon the iterative routine terminates; and,
       viii) an output routine to direct the computer to transmit trial design parameters to the computer output.

11. The apparatus design optimizer of claim 10, wherein the software implementation of the discretized well-posed hyperreal problem is generated using the method of claim 4.

12. An apparatus response simulator to numerically simulate the response of a physical system to an external environment, said apparatus response simulator comprising:
    a) a computer comprising a central processing unit, memory, and output means;
    b) a response simulation program, loaded in said memory and operating in said computer, comprising:
       i) a set of apparatus parameters describing the physical system;
       ii) a set of environmental parameters describing external conditions to which the physical system is subjected;
       iii) a software implementation of a discretized well-posed hyperreal problem generated using the method of claim 1, such that said software implementation generates an approximation of the physical response of the proposed apparatus to the external conditions when run on the computer, said approximation being expressed as a set of response parameters; and,
       iv) an output routine to direct the computer to transmit the set of response parameters to the computer output.

13. The apparatus response simulator of claim 12, wherein the software implementation of the discretized well-posed problem is generated using the method of claim 4.

* * * * *